United States Patent
Kang et al.

(10) Patent No.: US 11,922,577 B2
(45) Date of Patent: Mar. 5, 2024

(54) METHOD AND APPARATUS FOR ONLINE FITTING

(71) Applicant: CLO Virtual Fashion Inc., Seoul (KR)

(72) Inventors: Keu Cheol Kang, Seoul (KR); In Yong Jeon, Seoul (KR); Seung Woo Oh, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 17/517,674

(22) Filed: Nov. 3, 2021

(65) Prior Publication Data

US 2022/0157020 A1     May 19, 2022

(30) Foreign Application Priority Data

Nov. 16, 2020   (KR) .......................... 10-2020-0153168

(51) Int. Cl.
| | | |
|---|---|---|
| *G06T 17/20* | (2006.01) | |
| *G06Q 30/06* | (2023.01) | |
| *G06Q 30/0601* | (2023.01) | |
| *G06T 7/60* | (2017.01) | |
| *G06V 40/10* | (2022.01) | |

(52) U.S. Cl.
CPC ....... *G06T 17/205* (2013.01); *G06Q 30/0643* (2013.01); *G06T 7/60* (2013.01); *G06V 40/103* (2022.01)

(58) Field of Classification Search
CPC ......... G06T 17/205; G06T 7/60; G06T 19/00; G06T 17/20; G06T 2210/16; G06T 2210/21; G06T 19/20; G06T 2200/04; G06T 7/73; G06T 13/40; G06Q 30/0643; G06V 40/103

See application file for complete search history.

(56) References Cited

U.S. PATENT DOCUMENTS 10,332,176 B2 *  6/2019  Gadre ................. G06Q 10/087
10,789,774 B2    9/2020  Oh
(Continued)

FOREIGN PATENT DOCUMENTS

KR   10-2009-0129274 A    12/2009
KR   10-2014-0123228 A    10/2014
(Continued)

OTHER PUBLICATIONS

Cordier,, F. et al. "Made-to-Measure Technologies for an Online Clothing Store." IEEE Computer Graphics and Applications, vol. 23, No. 1, Jan.-Feb. 2003, pp. 38-48 (Year: 2003).*

(Continued)

*Primary Examiner* — Michael Le
(74) *Attorney, Agent, or Firm* — WTA Patents

(57) ABSTRACT

An online fitting method and apparatus receive, from a user, a body size of the user and a target size of clothes desired by the user for fitting, obtain barycentric coordinate information corresponding to a result of fitting the clothes of the target size to a reference avatar selected based on the body size of the user, generate a target avatar having the same mesh topology as the reference avatar and corresponding to the body size of the user, fit the clothes to the target avatar by applying the barycentric coordinate information to the target avatar, and display a result of fitting the clothes to the target avatar.

20 Claims, 11 Drawing Sheets

(56) References Cited

U.S. PATENT DOCUMENTS

| | | | | |
|---|---|---|---|---|
| 2009/0303235 | A1* | 12/2009 | Maekawa | G06T 17/205 382/300 |
| 2010/0030578 | A1* | 2/2010 | Siddique | H04W 4/00 705/26.1 |
| 2014/0168217 | A1* | 6/2014 | Kim | G06Q 30/0643 345/420 |
| 2015/0006334 | A1* | 1/2015 | Behuria | G06Q 30/0643 705/27.2 |
| 2016/0027200 | A1* | 1/2016 | Corazza | G06T 15/04 345/420 |
| 2021/0049811 | A1* | 2/2021 | Fedyukov | G06T 7/60 |

FOREIGN PATENT DOCUMENTS

| | | |
|---|---|---|
| KR | 10-2019-0063742 A | 6/2019 |
| KR | 10-2019-0114676 A | 10/2019 |
| KR | 10-2020-0015925 A | 2/2020 |

OTHER PUBLICATIONS

Lee, Y. et al. "Automatic Pose—Independent 3D Garment Fitting." Computers & Graphics, vol. 37, No. 7, Nov. 2013, pp. 911-922. (Year: 2013).*

Cordier, F. et al. "Made-to-Measure Technologies for an Online Clothing Store." IEEE Computer Graphics and Applications, vol. 23, No. 1, Jan.-Feb. 2003, pp. 38-48.

Lee, Y. et al. "Automatic Pose-Independent 3D Garment Fitting." Computers & Graphics, vol. 37, No. 7, Nov. 2013, pp. 911-922.

Li, J. et al. "Customizing 3D Garments Based on Volumetric Deformation." Computers in Industry, vol. 62, No. 7, Sep. 2011, pp. 693-707.

Zhang, M. et al. "Topology-Independent 3D Garment Fitting for Virtual Clothing." Multimedia Tools and Applications, vol. 74, No. 9, May 2015, pp. 3137-3153.

* cited by examiner

METHOD AND APPARATUS FOR ONLINE FITTING

CROSS-REFERENCE TO RELATED APPLICATION

This application claims the benefit of Republic of Korea Patent Application No. 10-2020-0153168 filed on Nov. 16, 2020, in the Korean Intellectual Property Office, the entire disclosure of which is incorporated herein by reference for all purposes.

BACKGROUND

1. Field of the Invention

Embodiments relate to determining whether clothes can successfully fit a user's body by simulating draping of the clothes on avatars.

2. Description of the Related Art

Clothes appear in three dimensions when worn on a person's body, but clothes are made up of fabrics that can be viewed as two dimension objects. Fabric, material for clothes, is flexible and may thus be varied in appearance from moment to moment according to the body shape or motion of a person who wears it. Also, fabric has various physical properties such as strength, ductility and a shrinkage factor, and thus, how the fabric is represented in clothes and is felt when worn on a person may differ even in clothes of the same design, due to a difference in such physical properties of fabric. Verifying whether clothes draped over an avatar fit the avatar may involve numerous operations and a large amount of data, and thus, a fast verification of such may not be readily performed on a computer with limited capabilities and resources.

SUMMARY

Embodiments relate to a computer-implemented online fitting method that determines whether clothes of a target size can successfully be fitted to a user's body by applying barycentric coordinate information to a target avatar that corresponds to the size of the user's body. The size of the user's body and the target size of clothes for fitting the user's body is received. The barycentric coordinate information corresponding to a result of fitting the clothes of the target size to a reference avatar is obtained. The target avatar has a mesh with a topology that is identical to a topology of a mesh of the reference avatar. Whether the clothes of the target size successfully fits the target avatar is determined by at least applying the barycentric coordinate information to the target avatar.

In one or more embodiments, the barycentric coordinate information includes at least one of (i) indices of a first polygon in the mesh of the reference avatar or (ii) parameters representing a three-dimensional (3D) transformation relationship between the first polygon and a second polygon in a mesh of the clothes that fits the reference avatar.

In one or more embodiments, the parameters include at least one of (i) coefficients for calculating the barycentric coordinate information, (ii) an offset between the first polygon and the second polygon, or (iii) identification information of the mesh of the reference avatar corresponding to the barycentric coordinate information.

In one or more embodiments, the clothes fits the target avatar by extracting, from the barycentric coordinate information, an index of a first polygon in the mesh of the reference avatar and a plurality of parameters representing a point of the clothes matching the first polygon, identifying a target polygon corresponding to the first polygon from the mesh of the target avatar based on the topology of the mesh of the target avatar and the index of the first polygon, and determining the point of the clothes by applying the parameters to the target polygon. The determined point of the clothes corresponds to the result of fitting the clothes to the target avatar.

In one or more embodiments, the clothes are fitted to the target avatar by: identifying a target polygon in the mesh of the target avatar for mapping to a first polygon in the mesh of the reference avatar using correspondence between an index of the first polygon and an index of the target polygon; and fitting the clothes to the target avatar by applying the barycentric coordinate information to each point of the target polygon mapped to the first polygon.

In one or more embodiments, the clothes includes a supplemental material. The clothes is fitted to the target avatar by: obtaining supplemental barycentric coordinate information corresponding to a result of attaching the supplemental material to the clothes; and apply the supplemental barycentric coordinate information to the clothes that is fitted to the target avatar.

In one or more embodiments, when the supplemental material is a rigid body, the supplemental barycentric coordinate information is applied to the clothes by applying the supplemental barycentric coordinate information to the clothes fitted to the target avatar by applying the supplemental barycentric coordinate information and a 3D orientation of the supplemental material to a point of a mesh of the supplemental material.

In one or more embodiment, obtaining the barycentric coordinate information comprises receiving the barycentric coordinate information from a server or a database.

In one or more embodiments, results of fitting clothes of different sizes to reference avatars of different body sizes are stored as prestored barycentric coordinate information. The barycentric coordinate information corresponding to the result of fitting the clothes of the target size to the reference avatar is obtained from the prestored barycentric coordinate information.

In one or more embodiments, the different body sizes are sampled at a unit interval for each size of the clothes.

In one or more embodiments, in response to determining that the clothes of the target size is not successfully fitted to the target avatar, a message is displayed notifying that the fitting is unsuccessful.

In one or more embodiments, whether the clothes of the target size is successfully fitted is determined by detecting the presence of an intersection between a target polygon in the mesh of the target avatar and a polygon in a mesh of the clothes fitted to the reference avatar; and in response to the presence of the intersection, determining that the clothes of the target size are successfully fitted.

In one or more embodiments, whether the clothes of the target size is successfully fitted comprises determining first distances between points on a mesh of the clothes and the mesh of the reference avatar with the clothes fitted to the reference avatar; determining second distances between points on the mesh of the clothes and the mesh of the target avatar; and determining whether the fitting is successful based on differences between the first distances and corresponding ones of the second distances.

In one or more embodiments, the first distances are determined by obtaining points of polygons in a mesh of the clothes as the points on the mesh of the clothes, the polygon in contact with the mesh of the reference avatar; and determining, as the first distances, distances between barycentric coordinates of polygons in the mesh of the reference avatar that are nearest to the obtained points of the polygons in the mesh of the clothes.

In one or more embodiments, the second distances are determined by obtaining points of polygons in a mesh of the clothes as the points on the mesh of the clothes, the polygon in contact with a target polygon in the mesh of the target avatar; and determining, as the second distances, distances between barycentric coordinates of polygons in the target avatar that are nearest to the obtained points.

In one or more embodiments, whether the fitting is successful is determined by calculating a maximum value of the differences between the first distances and the corresponding second differences; and determining whether the fitting is successful based on whether the maximum value is greater than a threshold value.

In one or more embodiments, determining whether the fitting is successful is determined by calculating an average value of the differences between the first distances and the corresponding second distances; and determining whether the fitting is successful based on whether the average value is greater than a second threshold value.

In one or more embodiments, guidance on a candidate size corresponding to the clothes based on the size of the user's body is provided through visualization.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
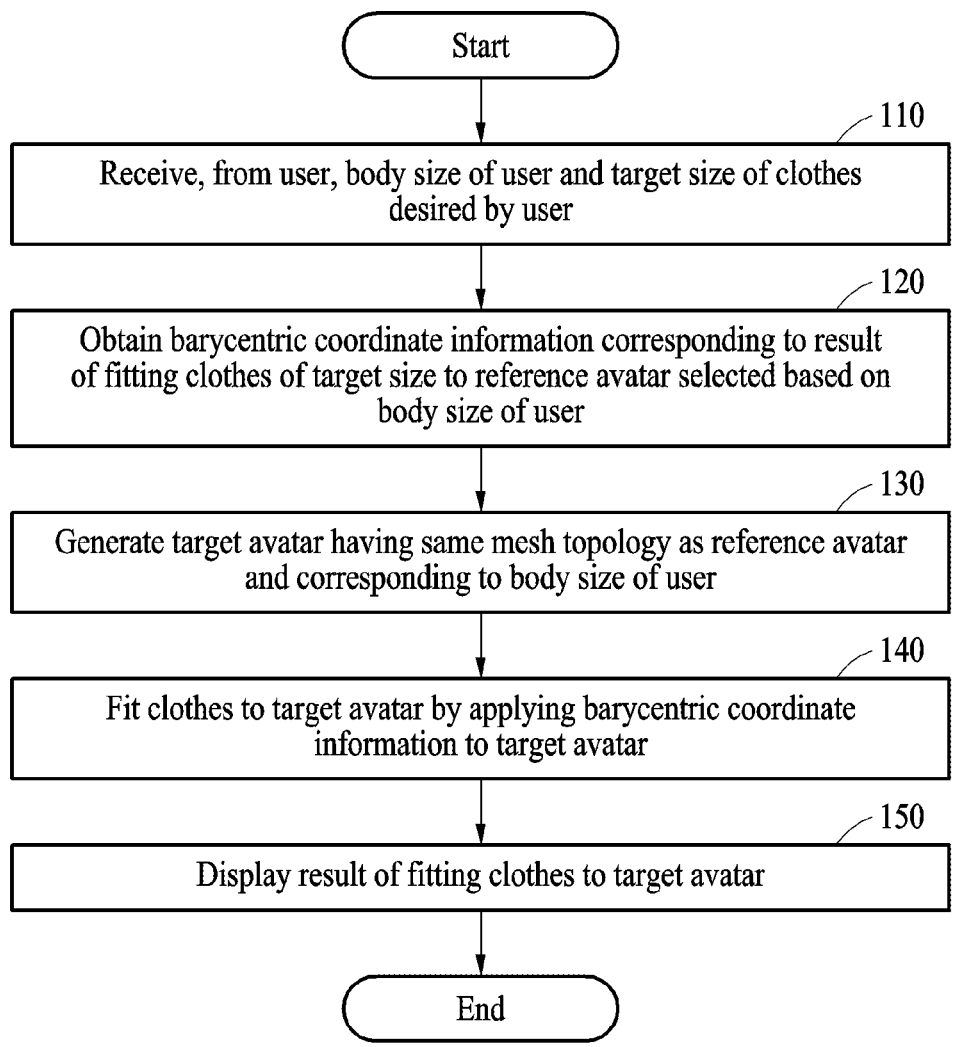
FIG. 1 is a flowchart illustrating an example of an online fitting method, according to an example embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is for the purpose of describing particular examples only and is not intended to limit the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Furthermore, in describing example embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

A "reference avatar" described herein refers to a virtual three-dimensional (3D) object having a different body size for each body part. The reference avatar may correspond to a body size sampled at a unit interval, for each clothing size, for example, a small (S) size, a medium (M) size, and a large (L) size. The unit interval may be, for example, 1 centimeter (cm), 2.5 cm, or 5 cm, for the height or the waistline. The unit interval may also be, for example, 2.5 kilograms (kg), 5 kg, or 10 kg, for the weight.

A "target avatar" described herein refers to a virtual 3D object having the same mesh topology as the reference avatar and over which clothes corresponding to a body size of a user is to be draped. The target avatar may have at least one body part having a similar size as the reference avatar. A body type of the reference avatar and/or the target avatar may be classified by features indicated in a physique according to height, weight, waistline, the thickness of an arm, the thickness of a leg, or the like. The body type may include, for example, a skinny body type, a standard body type, an obese upper body type, an obese lower body type, an obese upper and lower body type, a skinny fat body type, and the like. The body type of the target avatar may be determined based on, for example, a body size of an average person according to race, age, and/or gender, in addition to a body size input from a user.

Figure 5:
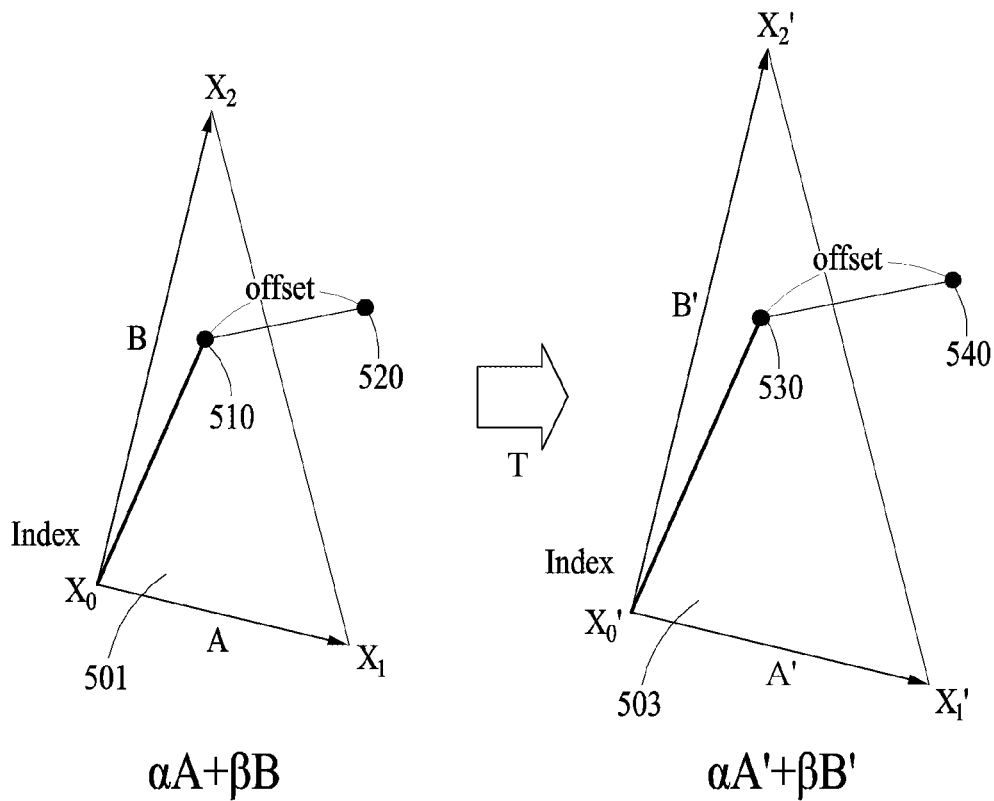
FIG. 5 is a diagram illustrating an example of a method of fitting clothes to a target avatar, according to an example embodiment.

The reference avatar and/or the target avatar may be modeled with a polygon mesh of a unit figure, for example, a triangle as illustrated in FIG. 5. In some cases, the unit figure may be a 3D polyhedron (e.g., a tetrahedron). Hereinafter, the unit figure included in a mesh will be assumed as a polygon, for example, a triangle, for the convenience of description. However, the unit figure is not limited to the foregoing example.

Hereinafter, a mesh forming the reference avatar will be referred to as a first mesh, and a polygon included in the first mesh will be referred to as a first polygon. In addition, an index indicating the first polygon will be referred to as an index of the first polygon or simply as a first polygon index. A first mesh is composed of a plurality of first polygons, and an index of one first polygon uniquely identifies that polygon among the plurality of the first polygons. Similarly, a mesh forming clothes draped over the reference avatar will be referred to as a second mesh, and a polygon included in the second mesh will be referred to as a second polygon. In addition, an index indicating the second polygon will be referred to as an index of the second polygon or simply as a second polygon index. A second mesh is composed of a plurality of second polygons, and an index of one second polygon uniquely identifies that polygon among the plurality of the second polygons. Similarly, a mesh forming the target avatar will be referred to as a third mesh, and a polygon included in the third mesh will be referred to as a target polygon. In addition, an index indicating the target polygon will be referred to as an index of the target polygon or simply as a target polygon index. A third mesh is composed of a plurality of target polygons, and an index of one target polygon uniquely identifies that polygon among the plurality of the target polygons.

A mesh may be modeled in various ways. For example, vertices of a polygon included in the mesh may be point masses having masses, and sides of the polygon may be represented as springs having elasticity that connects the point masses. Thus, clothes may be virtual 3D clothes modeled by a mass-spring model, for example. The springs may have respective resistance values against, for example, stretch, shear, and bending, depending on a physical property of fabric used. Alternatively, the mesh may be modeled as a strain model. The polygon included in the mesh may be modeled as a triangle, or as a tetragon or higher polygon. In some cases, when a 3D volume needs to be modeled, the mesh may be modeled as a 3D polyhedron.

Vertices included in the mesh may move by an external force such as gravity, and an internal force such as stretch, shear, and bending. When a force applied to each vertex is determined by calculating the external force and the internal force, a speed of displacement and motion of each vertex may be determined. A movement of clothes may be simulated by motions of vertices of polygons included in the mesh in each time step. For example, when clothes formed with a polygon mesh are draped over a 3D avatar, virtual 3D clothes that look natural based on the laws of physics may be implemented. Hereinafter, a vertex of a polygon included in a mesh will also be referred to as a point, and thus, the terms "vertex" and "point" are used interchangeably herein.

When clothes is draped over or fitted to the reference avatar and the target avatar, a volume or shape may differ for the reference avatar and the target avatar while connective relationships between meshes included in each of the avatars and/or the number of polygons forming the meshes may be the same.

FIG. 1 is a flowchart illustrating an example of an online fitting method, according to an example embodiment. Referring to FIG. 1, an online fitting apparatus may display a result of fitting clothes selected by the user to a target avatar corresponding to a body size of a user through operations 110 through 150 described hereinafter.

In operation 110, the online fitting apparatus receives, from a user, a body size of the user and a target size of clothes desired by the user to drape. The terms "drape," "draping," "fit" and "fitting" described herein may be construed as a process of simulating donning of 3D clothes of a target size selected by a user on a 3D avatar generated by a computer program. Hereinafter, the terms "drape/draping" and "fit/fitting" may be construed as having the same meaning in that they both connote putting clothes on an avatar. For example, the online fitting apparatus may receive the body size of the user, the clothes selected by the user to drape, and/or a size (or the target size) of the clothes selected by the user to drape, through a user interface (UI) displayed on a touch display or a display. For another example, when the body size of the user is stored in advance, the online fitting apparatus may receive, from the user, a selection made by the user, for example, clothes selected by the user and a size (or a target size) of the clothes.

In operation 120, the online fitting apparatus obtains barycentric coordinate information corresponding to a result of fitting the clothes of the target size to a reference avatar. The reference avatar is selected based on the body size of the user received in operation 110. For example, in operation 120, the online fitting apparatus may retrieve the result of fitting the clothes of the target size to a reference avatar of a size that is the most similar to the actual body size of the user. In this way, the number of operations for obtaining a result of fitting the clothes to a target avatar can be reduced. The barycentric coordinate information may further include information associated with a mesh forming the clothes of the target size, in addition to barycentric coordinates.

Specifically, the barycentric coordinate information may include at least one of a first polygon index or parameters indicating a 3D position transformation relationship between a first polygon of a first mesh forming the reference avatar and a point of a second polygon of a second mesh forming the clothes draped over the reference avatar. The parameters may include coefficients for calculating the barycentric coordinate information, an offset between the first polygon and the point of the second polygon, and identification information (e.g., an identifier (ID)) of the second mesh corresponding to the barycentric coordinate information. The identification information of the second mesh may be used to identify which second mesh corresponds to the barycentric coordinate information.

Alternatively, when a supplemental material is a rigid body, the parameters may further include a 3D orientation of the supplemental material. The 3D orientation of the supplemental material may have a form of a 3×3 matrix, but is not limited thereto.

The online fitting apparatus may generate and prestore barycentric coordinate information corresponding to results of fitting clothes of different sizes to reference avatars having different body sizes. The body sizes of the reference avatars may be obtained by sampling a body size at a unit interval.

In operation 120, the online fitting apparatus may receive the barycentric coordinate information from a server or a database. The barycentric coordinate information obtained in operation 120 will be described in detail with reference to FIG. 2. Also, sampling body sizes of avatars at a unit interval will be described in detail with reference to FIG. 3A.

In operation 130, the online fitting apparatus generates a target avatar having the same mesh topology as the reference avatar and corresponding to the body size of the user. Since the target avatar and the reference avatar have the same mesh topology, correspondence between polygons in the mesh of the reference avatar and polygons in the mesh of the target avatar can be determined using indices of the polygons. That is, a polygon in the mesh of the reference avatar corresponds to another polygon in the mesh of the target avatar when the indices of the polygons match. The online fitting apparatus may generate the target avatar based on the body size input by the user.

In another example, in operation 130, the online fitting apparatus may generate the target avatar by searching for a reference avatar having a size that is the nearest to the body size of the user and compensate for a difference between the size of the retrieved reference avatar and the body size of the user. The online fitting apparatus may map a corresponding target polygon index of the target avatar to a first polygon index of the reference avatar using corresponding relationships between polygons of meshes respectively forming the reference avatar and the target avatar. The online fitting apparatus may generate the target avatar by compensating for a value (e.g., coefficients and/or an offset between points in the polygons) corresponding to a difference between the mapped indices.

In operation 140, the online fitting apparatus fits, to the target avatar, the clothes desired by the user to drape by applying the barycentric coordinate information obtained in operation 120 to the target avatar generated in operation 130. For example, the online fitting apparatus identifies a target polygon to be mapped to a first polygon based on a corresponding relationship between the first polygon index of the first mesh forming the reference avatar and the target polygon index of a third mesh forming the target avatar. The online fitting apparatus may fit the clothes to the target avatar by applying the barycentric coordinate information to each point of the target polygon mapped to the first polygon. Hereinafter, how the online fitting apparatus fits the clothes desired by the user to the target avatar will be described in detail with reference to FIG. 4.

In operation 150, the online fitting apparatus displays a result of fitting the clothes to the target avatar. As the result of fitting the clothes to the target avatar, the online fitting apparatus may determine the presence of an intersection occurring between the target polygon of the third mesh (forming the target avatar) and the second polygon of the second mesh (forming the clothes draped over the reference avatar) in operation 150. In this example, when the intersection between the target polygon of the third mesh and the second polygon of the second mesh, the online fitting apparatus may display a message notifying that the fitting is unsuccessful. For example, when the second mesh is deformed by a reference value or beyond the reference value, the online fitting apparatus may display the message notifying that the fitting is unsuccessful.

For example, in operation 150, the online fitting apparatus may determine whether the fitting is unsuccessful based on a difference between the number of intersections occurring between the target polygon of the third mesh and the second polygon of the second mesh and a preset reference number. In this example, when the number of intersections is greater than or equal to the preset reference number (e.g., 2), the online fitting apparatus may determine the fitting to be unsuccessful. In contrast, when the number of intersections is less than the preset reference number, the online fitting apparatus may determine the fitting to be successful.

Alternatively, the online fitting apparatus may determine whether the fitting is unsuccessful based on the result of fitting the clothes to the target avatar, and display the message notifying that the fitting is unsuccessful when the fitting is determined to be unsuccessful. Hereinafter, how the online fitting apparatus determines whether the fitting is unsuccessful will be described in detail with reference to FIGS. 7A through 8.

As another example, when the fitting is determined to be unsuccessful, the online fitting apparatus may visualize and guide a candidate size range corresponding to the clothes based on the body size of the user. The candidate size range may refer to a range of sizes that does not cause the clothes to slip down or fall off the body of the user when the user wears the clothes. Hereinafter, how the online fitting apparatus visualizes and guides the candidate size range will be described in detail with reference to FIG. 9.

Figure 2:
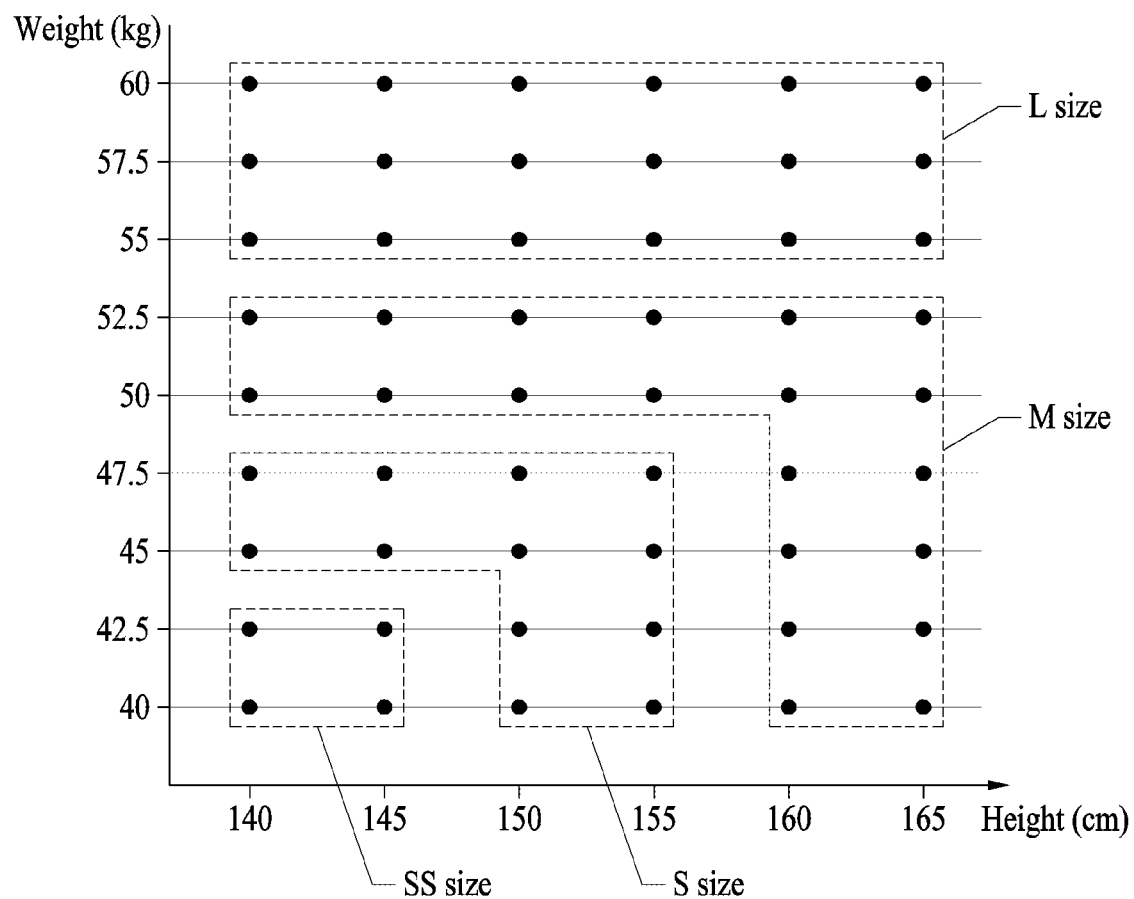
FIG. 2 is a diagram illustrating an example of barycentric coordinate information obtained by draping in advance clothes of different sizes over reference avatars, according to an example embodiment.

FIG. 2 is a diagram illustrating an example of barycentric coordinate information corresponding to results of draping in advance clothes of different sizes over reference avatars, according to an example embodiment. FIG. 2, illustrates a graph indicating sizes of clothes corresponding to body sizes sampled at a unit interval based on an average height and an average weight of a user.

The body sizes corresponding to the sizes of the clothes may be classified by, for example, race, age, gender, and the like. For example, the body sizes may be sampled at the same interval or different unit intervals according to a user, for example, an Asian male adult, an Asian female adult, a European male adult, an American female adult, an African male child, an African female child, and the like. In addition, the sizes of the clothes corresponding to each body part may be set differently based on race, age, gender, and the like.

An online fitting apparatus may store, in advance, barycentric coordinate information corresponding to results of draping clothes of different sizes such as a small (S) size, a medium (M) size, and a large (L) size, over reference avatars with different body sizes for each body part such as a waistline, a length of an arm, a length of a leg in addition to height and weight as illustrated in FIG. 2.

For example, the online fitting apparatus may prestore, in advance, barycentric coordinate information corresponding to results of fitting clothes of an S size over reference avatars having different body sizes, for example, a reference avatar having a body size with a height of 140 cm and a weight of 40 kg, a reference avatar having a body size with a height of 145 cm and a weight of 40 kg, a reference avatar having a body size with a height of 150 cm and a weight of 40 kg, a reference avatar having a body size with a height of 155 cm and a weight of 40 kg, a reference avatar having a body size with a height of 160 cm and a weight of 40 kg, a reference avatar having a body size with a height of 140 cm and a weight of 42.5 kg, a reference avatar having a body size with a height of 145 cm and a weight of 42.5 kg, a reference avatar having a body size with a height of 150 cm and a weight of 42.5 kg, a reference avatar having a body size with a height of 155 cm and a weight of 42.5 kg, a reference avatar having a body size with a height of 160 cm and a weight of 42.5 kg, a reference avatar having a body size with a height of 140 cm and a weight of 45 kg, a reference avatar having a body size with a height of 145 cm and a weight of 45 kg, a reference avatar having a body size with a height of 150 cm and a weight of 45 kg, a reference avatar having a body size with a height of 155 cm and a weight of 45 kg, and a reference avatar having a body size with a height of 160 cm and a weight of 45 kg.

Similarly, the online fitting apparatus may prestore, in advance, barycentric coordinate information corresponding to results of draping clothes of an M size and an L size over each of reference avatars having different body sizes.

The online fitting apparatus may calculate and prestore, in advance, barycentric coordinate information corresponding to results of fitting clothes to each of reference avatars having 20 different body sizes for each clothing size.

The online fitting apparatus may reduce the amount of operations for a fitting simulation by varying a body size with respect to clothes of a corresponding size based on a path through which a degree of deformation is reduced during the fitting simulation where clothes is draped over or fitted to each of avatars having body sizes sampled as illustrated in FIG. 2. The path may include, for example, a path through which height changes with respect to the same weight. Hereinafter, performing such a fitting simulation by varying a body size in response to clothes of a corresponding size will be described in detail with reference to FIGS. 3A through 3C.

For example, clothes of a size may be too large for each of sampled body sizes and slip through or fall down in the fitting simulation. In such an example, the online fitting apparatus may detect when the clothes is loose and slip from the body, determine a body size that fits the body size (among different body sizes close to the body size causing loose fit and slipping), and continue a fitting simulation with the discovered body size. When clothes of an L size is draped over a reference avatar having a body size with a height of 140 cm and a weight of 45 kg and the clothes slip down from the reference avatar, the online fitting apparatus may then perform a fitting simulation using an avatar having a body size with a height of 165 cm and a weight of 45 kg that is nearest to the body size with the height of 140 cm and the weight of 45 kg and is well-fitted to the clothes of the L size. Hereinafter, how the online fitting apparatus detects whether fitting is unsuccessful, for example, a case in which clothes slip down, will be described in detail with reference to FIGS. 7 and 8.

According to an example embodiment, the online fitting apparatus may perform a fitting simulation as follows. The online fitting apparatus may collect clothes data of clothes and avatar data. Each of the clothes data and the avatar data may include mesh data, and the mesh data may include a position, a normal vector, and an index of each of polygons included in a mesh structure.

The online fitting apparatus may detect a degree of proximity between pieces of clothes, and a degree of proximity between clothes and an avatar. The detected proximity may be used to determine an external force that prevents a collision in a subsequent step.

The online fitting apparatus may calculate a force applied to a cloth, and a Jacobian. The online fitting apparatus may calculate a force applied to a plurality of polygons included in a mesh of the cloth, and the Jacobian. The force described herein may be divided into an internal force and an external force. The internal force may include a force by a physical property of a cloth or sewing, such as the force of the cloth tending to contract or shrink, and the force of the cloth tending to expand. The external force may include a force externally applied to a cloth, such as gravity. A force added in a simulation to prevent a collision between a cloth and a cloth or a collision between a cloth and an avatar may also be classified into the external force.

The online fitting apparatus may calculate an acceleration to be applied to the polygons included in the mesh of the cloth based simultaneously on both the force applied to the polygons and the Jacobian. For example, the online fitting apparatus may define simultaneous equations corresponding to the polygons as a linear system, and solve the linear system. The online fitting apparatus may calculate a velocity and a position from the acceleration of the polygons included in the mesh of the clothes.

In a fitting simulation, an operation may be performed to prevent a potential collision by solving the linear system. However, there may still be a collision between pieces of clothes or a collision between the clothes and an avatar. The online fitting apparatus may separately process such collisions, and transfer a velocity and a position of the polygons without a collision to a subsequent iteration. The online fitting apparatus may perform a simulation of fitting clothes to an avatar by repeating such an iteration as described above.

For example, in an initial iteration, the simulation may be initiated based on an initial arrangement in which clothes roughly covers a portion around a corresponding part of an avatar. The initial arrangement may be provided by, for example, an arrangement plate technique of arranging pattern pieces forming clothes around each body part of the avatar. In the initial arrangement, there may be no collision between clothes and the avatar or collision between pieces of clothes. A force of gravity may act on pieces of the clothes as an external force, and the force of contraction by sewing may act as an internal force.

The online fitting apparatus may retrieve barycentric coordinate information corresponding to a result of fitting clothes of a target size to a reference avatar having a body size nearest to the body size of the user input in operation 110 described above with reference to FIG. 1.

Figure 3A:
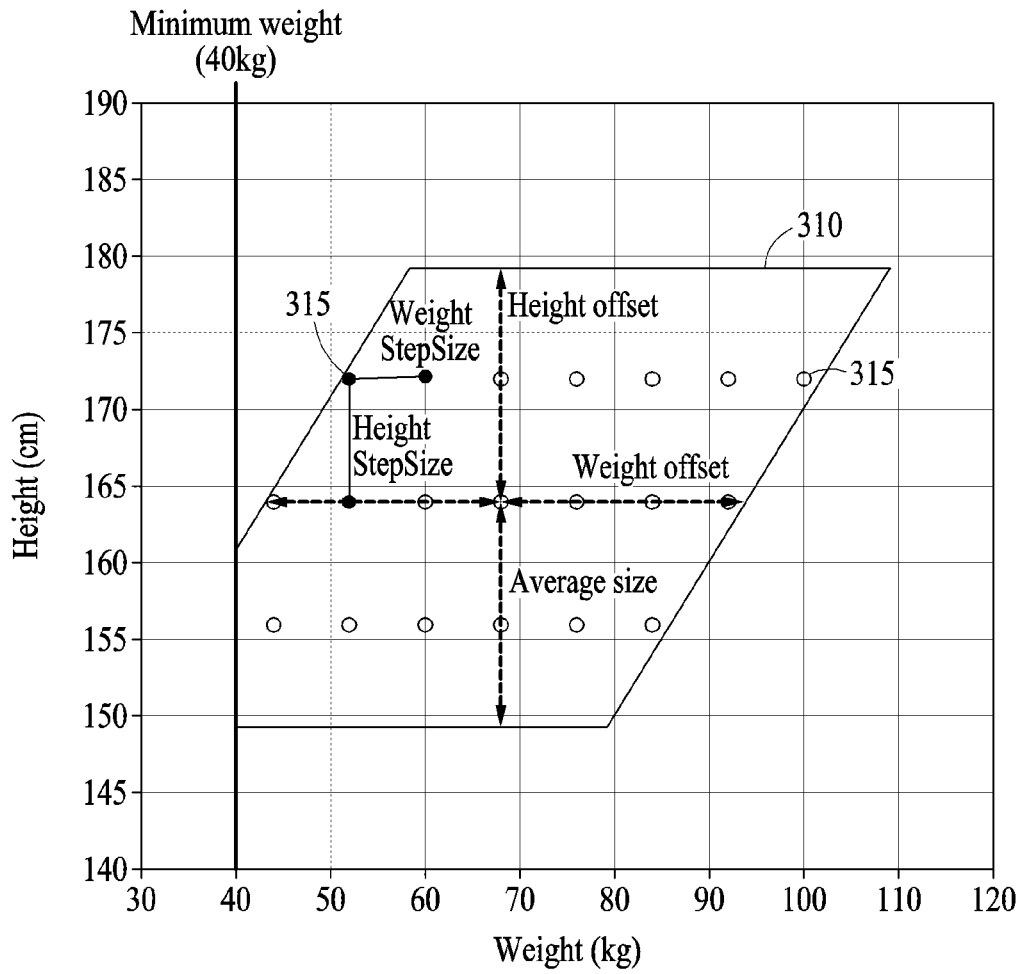
FIGS. 3A through 3C are diagrams illustrating examples of performing a fitting simulation by varying a size of an avatar to sample it at a unit interval with respect to clothes of a corresponding size, according to an example embodiment.
Figure 3B:
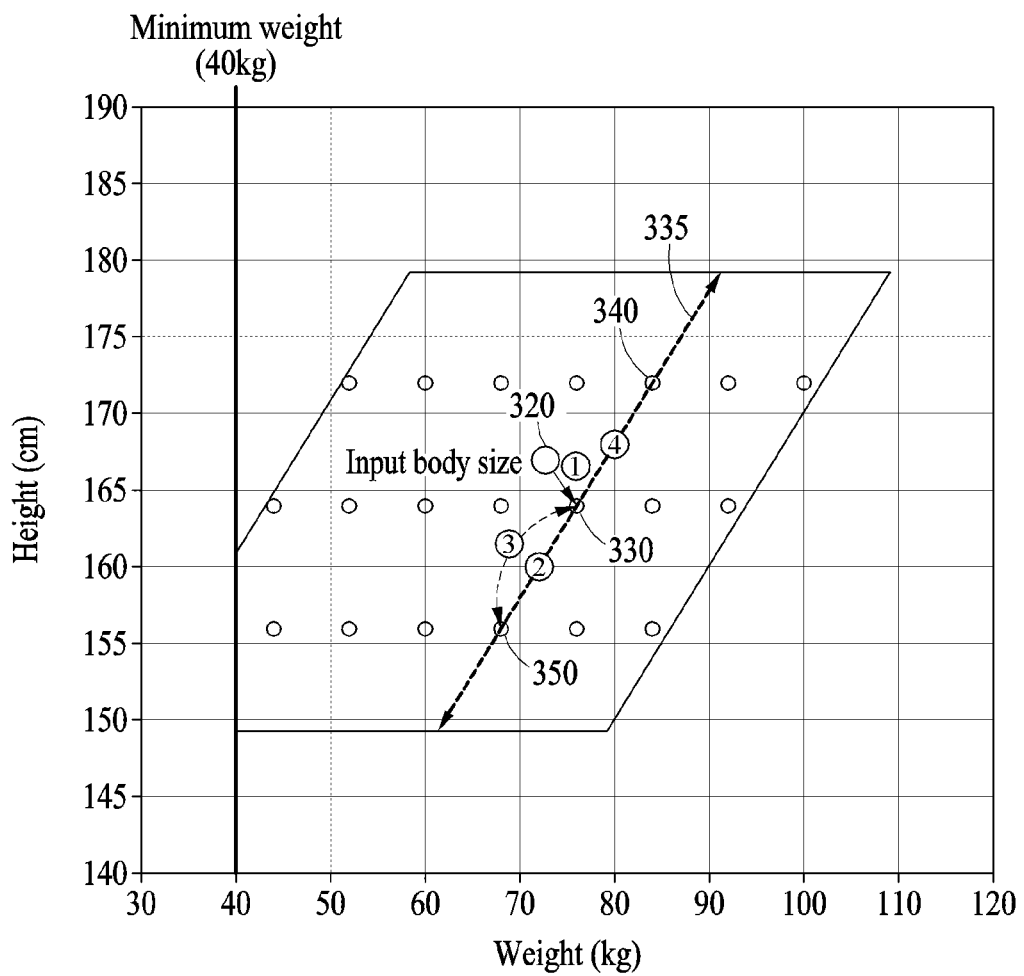
Figure 3C:
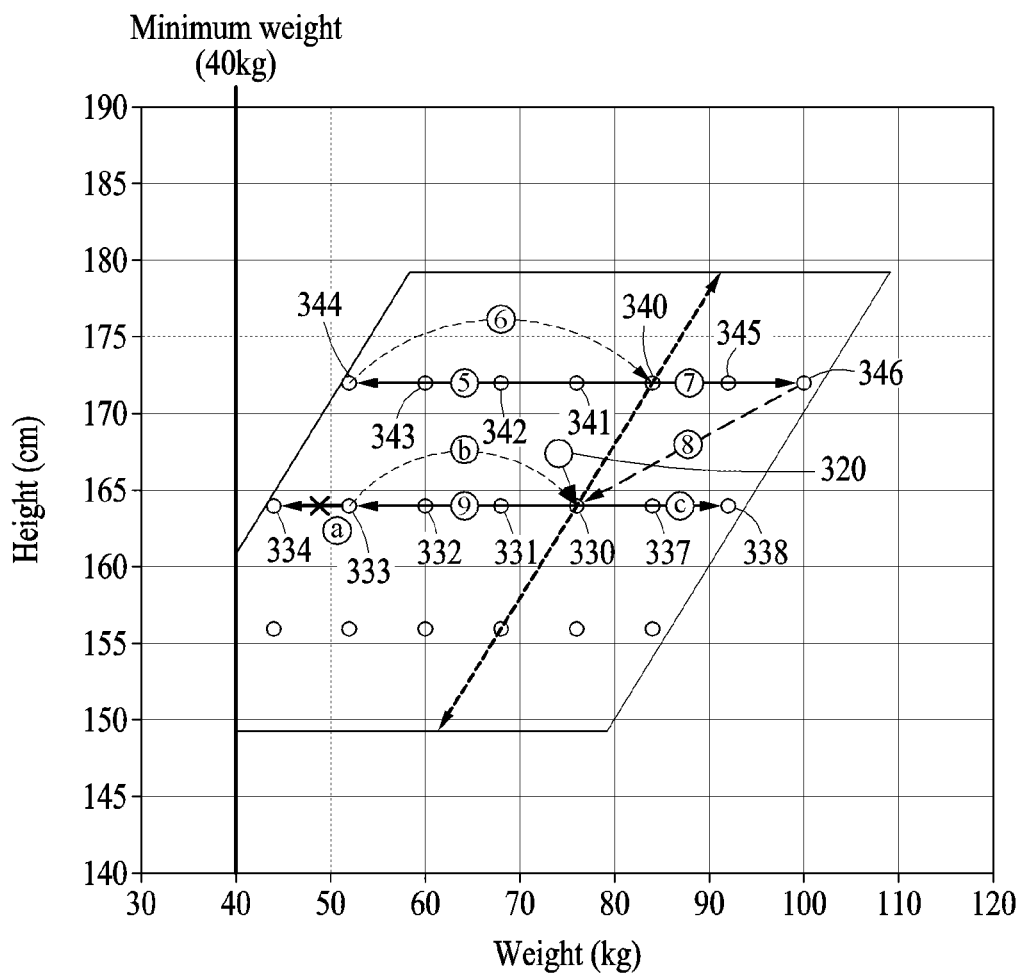

FIGS. 3A through 3C are diagrams illustrating examples of performing a fitting simulation by varying a size of an avatar to sample it at a unit interval with respect to clothes of a corresponding size according to an example embodiment.

In the example of FIG. 3A, illustrated is a method of determining an available avatar size when draping clothes of a corresponding size over an avatar. An avatar size described herein may be construed as including a body size of an avatar that is represented as a combination of height and weight, or a size of the avatar. Although an online fitting apparatus is described herein as performing operations as illustrated in FIGS. 3A through 3C for convenience, examples are not limited thereto. For example, a server may perform operations as illustrated in FIGS. 3A through 3C.

The online fitting apparatus may verify information including, for example, an offset for height, an offset for weight, and a minimum weight (e.g., 40 kg), from an average body size obtained based on, for example, the age and gender of a user. The online fitting apparatus may set an available sampling region corresponding to avatar sizes fit to clothes of a corresponding size based on the information verified from the average body size of the user. The offset for height, the offset for weight, and/or the minimum weight may be received as an input from a user, or their default values may be set in advance.

The online fitting apparatus may determine sample avatar sizes that are available when draping clothes of a corresponding size over an avatar by discovering an avatar size that is reachable within the available sampling region (e.g., an inner region 310 of a trapezoid illustrated in FIG. 3A) while gradually increasing or decreasing the height or weight by a step size from the average body size. The available sample avatar sizes may correspond to points 315 in the available sampling region 310. The step size for height and/or weight may correspond to a unit interval for each size of clothes, and may be received as an input from a user or set in advance as a default value.

The online fitting apparatus may perform fitting of clothes of a size selected by a user by varying a sample avatar size that is variable within the available sampling region 310 of FIG. 3A, as illustrated in FIGS. 3B and 3C. Referring to FIG. 3B, the online fitting apparatus may determine a sample size 330 as being closest to a body size 320 of a user input in operation 110 (described above with reference to FIG. 1) among the sample avatar sizes described above with reference to FIG. 3A (in step 1). The sample size 330 may also be referred to herein as an initial avatar size or a reference avatar size.

The online fitting apparatus may plot a line 335 that passes through the reference avatar size (e.g., the sample size 330) and is parallel to a right inclined plane of the available sampling region 310. The online fitting apparatus may then perform fitting of the clothes with sample avatar sizes 330, 340, and 350 that pass through the line 335. The online fitting apparatus may fit the clothes of the corresponding size to a sample size (e.g., the sample size 350) having a value smaller than the sample size 330 corresponding to the reference avatar size among sample sizes on the line 335, and then store fitting state information corresponding to the sample size 350 (in step 2).

When there is no sample size smaller than the sample size 330 on the line 335 other than the sample size 350, the online fitting apparatus may initialize the fitting simulation to a fitting state corresponding to the reference avatar size 330 (in step 3).

The online fitting apparatus may fit the clothes of the corresponding size to a sample size (e.g., the sample size 340) having a greater value than the sample size 330 among the sample sizes on the line 335, and then store fitting state information corresponding to the sample size 340 (in step 4). The online fitting apparatus may determine the closest sample size (e.g., the initial avatar size) among the sample sizes on the line 335, perform a fitting simulation with the size, and then store corresponding fitting state information. Subsequently, the online fitting apparatus may also perform a fitting simulation with samples of smaller sizes and store corresponding fitting state information.

The fitting state information described herein refers to information associated with a fitting state that indicates a state of fitting clothes of the corresponding size to a sample avatar size. The fitting state information may include, for example, position information between the clothes and each part of an avatar with the sample avatar size. The sample avatar size (e.g., the sample size 330, the sample size 340, and the sample size 350) for which the fitting state information is stored may also be referred to herein as a starting avatar size.

FIG. 3C illustrates how the online fitting apparatus fits clothes to sample sizes with the same height and different weights as starting avatar sizes based on the stored fitting state information, as described above. The online fitting apparatus may load the stored fitting state information corresponding to the starting avatar sizes, and perform fitting with each sample size.

The online fitting apparatus may perform fitting in a direction (e.g., a left direction) in which weight decreases with respect to sample sizes with the same size as the starting avatar size (in step 5). For example, the online fitting apparatus may perform fitting with sample sizes 341, 342, 343, and 344 of smaller weights than the sample size 340 among sample sizes 341, 342, 343, 344, 345, and 346 of the same height of 172.5 cm as illustrated in FIG. 3C. In this example, the online fitting apparatus may perform fitting towards the left direction in which the weights decrease gradually from the sample size 340, that is, in the order of the sample size 341, the sample size 342, the sample size 343, and the sample size 344.

When there is no further sample size with a smaller weight among the sample sizes of the same height as the sample size 340, the online fitting apparatus may initialize a fitting simulation state by loading fitting state information of the starting avatar size (e.g., the sample size 340) (in step 6). The sample sizes with weights less than a minimum weight (e.g., 40 kg) among the sample sizes with the same height as the sample size 340 may be excluded from processing.

Subsequently, the online fitting apparatus may perform fitting in a direction (e.g., a right direction) in which weight increases with respect to sample sizes with the same height as a starting avatar size (e.g., the sample size 340) (in step 7). For example, the online fitting apparatus may perform fitting with sample sizes 345 and 346 of weights greater than the weight of the sample size 340 among the sample sizes 341, 342, 343, 344, 345, and 346 of the same height as the sample size 340 illustrated in FIG. 3C. In this example, the online fitting apparatus may perform fitting in the right direction in which the weight increases gradually from the sample size 340 in order of the sample size 345 and the sample size 346.

When there is no further sample size of a different weight from the sample size 340 with the same height of 172.5 cm, the online fitting apparatus may load fitting state information of a subsequent starting avatar size (e.g., the sample size 330) (in step 8).

The online fitting apparatus may perform fitting with sample avatar sizes with the same height as the starting avatar size (e.g., the sample size 330) for which fitting state information is loaded, by repeating steps 5 through 8 (in step 9).

The online fitting apparatus may detect a fitting failure according to the process described above. When the fitting failure is detected, the online fitting apparatus may suspend performing further operations without continuing fitting with a subsequent sample size. For example, when a fitting failure is detected from an avatar having a sample size 333 while performing fitting in a sequential order of sample sizes 331, 332, 333, and 334 with the same height as a starting avatar size (e.g., the sample size 330) and with smaller weights, the online fitting apparatus may suspend performing further operations without continuing fitting with a subsequent sample size (e.g., the sample size 334) (in step a). Hereinafter, how the online fitting apparatus detects a fitting failure will be described in detail with reference to FIGS. 7 and 8.

The online fitting apparatus may disregard sample sizes with weights smaller than a current sample size (e.g., the sample size 333), and load fitting state information of the starting avatar size (e.g., the sample size 330) (in step b). Subsequently, the online fitting apparatus may proceed with fitting using avatars having sample sizes 337 and 338 of greater weights than the current sample size (e.g., the sample size 330) (in step c).

Figure 4:
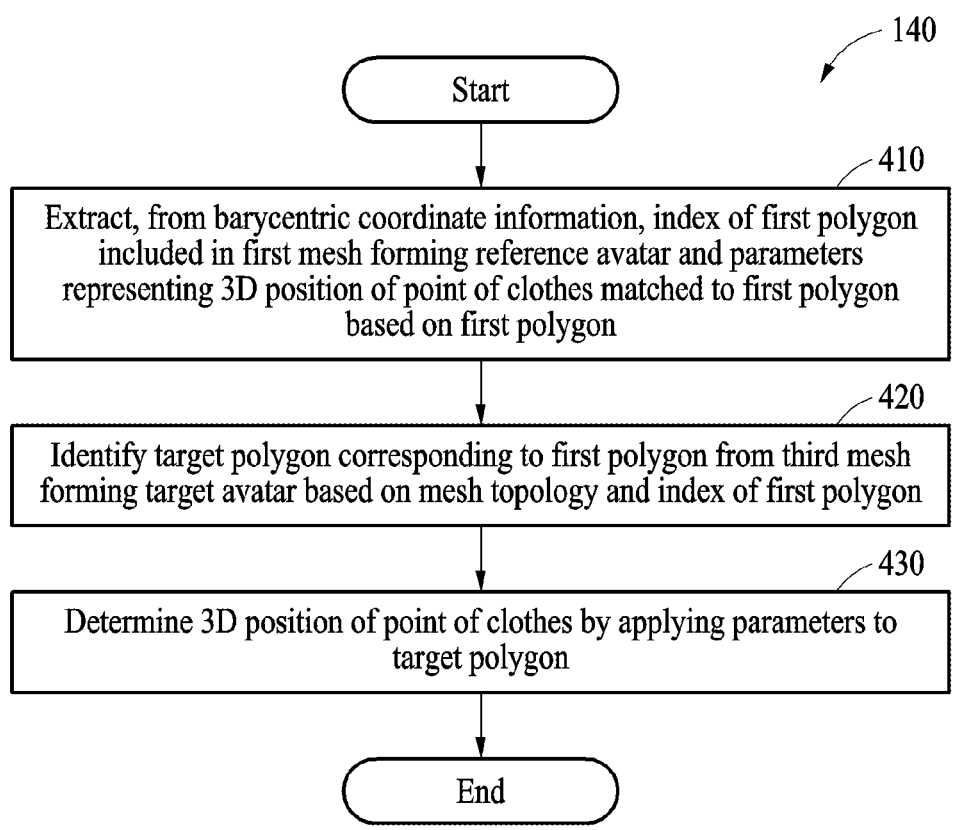
FIG. 4 is a flowchart illustrating an example of a method of fitting clothes to a target avatar, according to an example embodiment.

FIG. 4 is a flowchart illustrating an example of a method of fitting clothes to a target avatar, according to an example embodiment. Referring to FIG. 4, an online fitting apparatus may fit clothes desired by a user to a target avatar by performing operations 410 through 430 described hereinafter.

In operation 410, the online fitting apparatus extracts, from barycentric coordinate information, a first polygon index of a first polygon included in a first mesh forming a reference avatar, and a plurality of parameters representing a 3D position of a point of clothes matched to the first polygon based on the first polygon.

In operation 420, the online fitting apparatus identifies a target polygon corresponding to the first polygon from a third mesh forming a target avatar, based on a mesh topology and the first polygon index.

In operation 430, the online fitting apparatus determines the 3D position of the point of the clothes by applying the parameters to the target polygon. The determined 3D position of the point of the clothes may correspond to a result of fitting the clothes to the target avatar.

FIG. 5 is a diagram illustrating an example of a method of fitting clothes to a target avatar, according to an example embodiment. Referring to FIG. 5, illustrated are a first polygon 501 of a first mesh forming a reference avatar selected based on a body size of a user, and a target polygon 503 of a third mesh forming a target avatar corresponding to the body size of the user.

Vector A and vector B are a vector indicating a side constituting a polygon of a mesh that constitutes a reference avatar, and may be used to calculate barycentric coordinates, as represented below.

$$A = x_1 - x_0, B = x_2 - x_0$$

Vector A' and vector B' are a vector of a target avatar corresponding to the vectors A and B of the reference avatar.

$$A' = x_1' - x_0', B' = x_2' - x_0'$$

Points 520 and 540 are points of a polygon of a mesh that constitutes clothes. Points 510 and 530 indicate positions closest to the points 520 and 540 on an avatar based on a straight-line distance. The points 510 and 530 may be calculated as barycentric coordinates, as represented by the following equations. In the equations, P(a) denotes a position of point a.

$$P(510) = \alpha A + \beta B$$

$$P(530) = \alpha A' + \beta B'$$

An online fitting apparatus may obtain barycentric coordinate information between the first polygon 501 forming the reference avatar and each point of clothes of a target size draped over the reference avatar.

The online fitting apparatus may extract, from the obtained barycentric coordinate information, an index (e.g., index no. 14) of the first polygon 501 included in the first mesh forming the reference avatar, and a plurality of parameters representing a 3D position of a point 520 of the clothes matched to the first polygon 501 based on the first polygon 501. In addition to the index (e.g., index no. 14) of the first polygon 501, the online fitting apparatus may extract coefficients α and R for calculating the barycentric coordinate information, and an offset between a barycentric point 510 of the first polygon 501 and a point 520 of a second polygon of the clothes of the target size draped over the reference avatar. The first polygon 501 may not be a polygon of the clothes, but be a polygon (or a first polygon) of the reference avatar, and the point 520 may be one of points that constitute the polygon of the clothes. A polygon of the reference avatar that is closest to the point 520 constituting the polygon of the clothes may be the first polygon 501, and a point closest to the point 520 among points on the first polygon 501 may be the point 510.

The online fitting apparatus may identify the target polygon 503 corresponding to the first polygon 501 from the third mesh forming the target avatar based on the same mesh topology as the reference avatar and the index (e.g., index no. 14) of the first polygon 501. According to an example embodiment, the reference avatar and the target avatar have the same mesh topology, and thus, indices of polygons forming respective meshes may be mapped to each other. For example, a polygon with index no. 14 corresponding to a certain position (e.g., neck) of the reference avatar may be mapped to a polygon with index no. 14 corresponding to a certain position (e.g., neck) of the target avatar. The online fitting apparatus may identify the target polygon 503 of the target avatar corresponding to the first polygon 501 of the reference avatar, using correspondence between an index of the polygon of the reference avatar and an index of the polygon of the target avatar.

The online fitting apparatus has information on the positions of three points of the target polygon 503 of the target avatar based on the correspondence between the indices of the polygons, and thus, the online fitting apparatus may identify vectors A' and B' of the target polygon 503. The vectors A and B, and the vectors A' and B' indicate sides constituting a polygon, but may not be necessarily an orthogonal vector. For example, when a polygon is a right-angled triangle and the vectors A and B indicate two sides that form a right angle, the two vectors may be orthogonal vectors. However, when the polygon is not the right-angled triangle, there may be no orthogonal vector in the triangle. Specifically, when an angle formed by two vectors is Θ, Θ may have a value which is 0(rad)<Θ<π(rad). The online fitting apparatus may determine the 3D position of the point 540 of the clothes to be draped over the target avatar by applying the parameters (e.g., α and β) to the vectors A' and B' of the target polygon 503. The parameters α and β may be weights with respect to basis vectors, for example, A and B. A weight may be obtained as follows.

---

For a point 520,
1) Specify a mesh 501 on an avatar that is closest to a point 520.
2) Obtain a point 510 on the mesh 501 that is closest to the point 520.
3) Obtain barycentric coordinates (i.e., weights α and β) that indicate a position of the point 510 based on a relationship between vectors A and B of the triangle 501.
4) Obtain an offset that represents a relationship between the points 510 and 520.
5) Perform 1 through 4 on all points present on a mesh of clothes.

---

The 3D position of the point 540 of the clothes may correspond to a result of fitting the clothes desired by the user to the target avatar. The point 540 may be one point of a mesh that constitutes the clothes draped on the target avatar, and a position thereof may be obtained by transposing the point 520 using a correlation obtained using barycentric coordinates when the clothes are draped on the reference avatar. That is, dissimilar to the point 520, the point 540 may not necessarily be a point that is closest to a polygon on the target avatar.

The online fitting apparatus may apply a scale to an offset between the barycentric point 510 of the first polygon 501 and the point 520 of the second polygon of the clothes draped over the reference avatar, and apply an obtained result (i.e., scale) to an offset between a barycentric point 530 of the target polygon 503 and the point 540 of the polygon of the clothes to be draped over the target avatar. A scale may be obtained through various methods. For example, the scale may be obtained by a ratio between a square root of an area of the first polygon 501 and a square root of an area of the second polygon 503.

$$Scale = \frac{\sqrt{Area\ of\ second\ polygon}}{\sqrt{Area\ of\ first\ polygon}}$$

However, the size of the reference avatar and the size of the target avatar may be similar, and thus, an offset value (between the barycentric point 510 of the first polygon 501 and the point 520 of the second polygon of the clothes draped over the reference avatar) without scaling may be determined to be an offset value between the barycentric point 530 of the target polygon 503 and the point 540 of the polygon of the clothes to be draped over the target avatar. In principle, it is possible to obtain offset2 (i.e., 530-540) between the mesh of the clothes and the mesh of the target avatar by applying the scale obtained as described above to offset1 (i.e., 510-520). However, when a difference in measurement or size between the reference avatar and the target avatar is not extremely large, a degree by which this offset is scaled may be insignificant. In this case, an implementation may be performed without scaling the offset, that is, under the assumption that the scale is 1 (scale=1).

In a fitting simulation, an optimization process for solving a collision after draping or fitting may be performed. However, the size of the reference avatar and the size of the target avatar are similar, and thus, such an optimization process for solving a collision may be omitted.

In some cases, for example, when the online fitting apparatus uses a barycentric coordinate system method, the online fitting apparatus may transform a point of the clothes using a transformation matrix T between the reference avatar and the target avatar, and fit the clothes to the target avatar.

Figure 6:
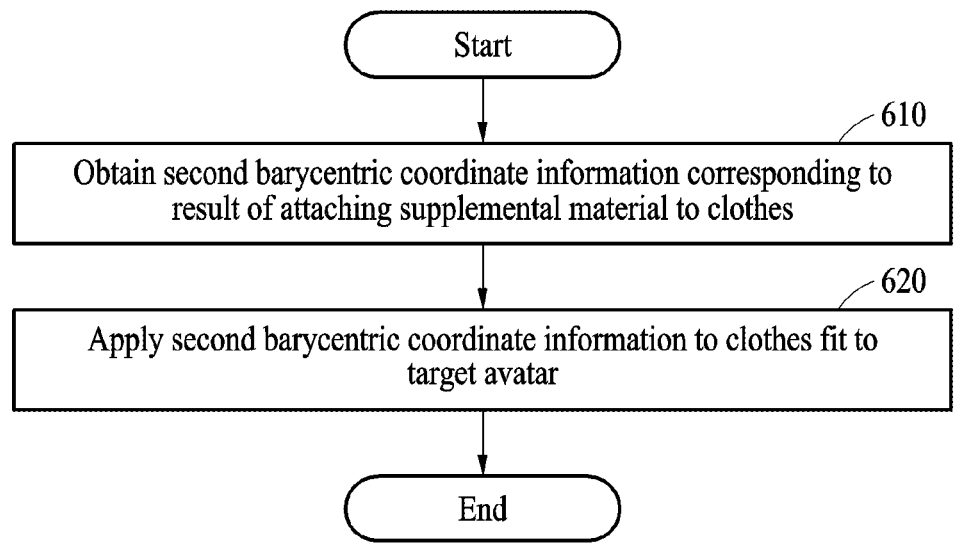
FIG. 6 is a flowchart illustrating an example of a method of fitting clothes including a supplemental material to a target avatar, according to an example embodiment.

FIG. 6 is a flowchart illustrating an example of a method of fitting clothes including a supplemental material to a target avatar, according to an example embodiment. Referring to FIG. 6, an online fitting apparatus may fit clothes including supplemental material to a target avatar by performing operations 610 through 620 to be described hereinafter.

In operation 610, the online fitting apparatus obtains supplemental barycentric coordinate information corresponding to a result of attaching a supplemental material to clothes. The supplemental material may be mapped to the clothes based on the supplemental barycentric coordinate information.

In operation 620, the online fitting apparatus applies the supplemental barycentric coordinate information to the clothes fit to the target avatar.

Alternatively, when the supplemental material is a rigid body with fixed shape and size (for example, a button), the online fitting apparatus may apply the supplemental barycentric coordinate information to the clothes draped over the target avatar by applying the supplemental barycentric coordinate information and a 3D orientation of the supplemental material with the rigid body to one point of a polygon in a mesh forming the supplemental material. In this example, the online fitting apparatus may apply both the supplemental barycentric coordinate information and the 3D orientation of the supplemental material to one point of the polygon of the mesh forming the supplemental material, allowing the supplemental material of a rigid type to be appropriately mapped at a desired orientation on the clothes.

Figure 7A:
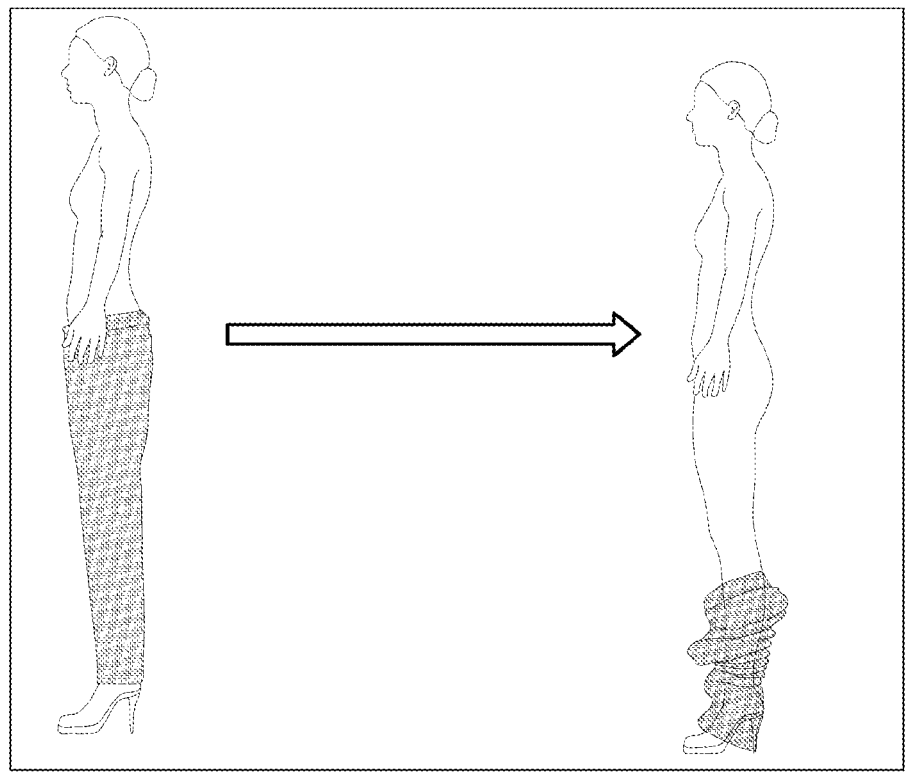
FIGS. 7A through 7C illustrate an example of detecting a fitting failure, according to an example embodiment.
Figure 7B:
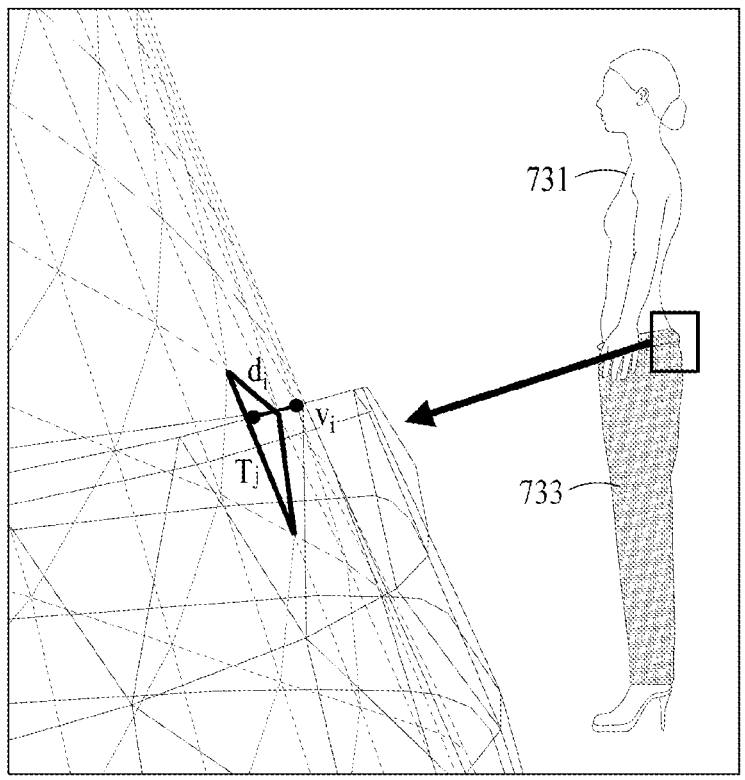
Figure 7C:
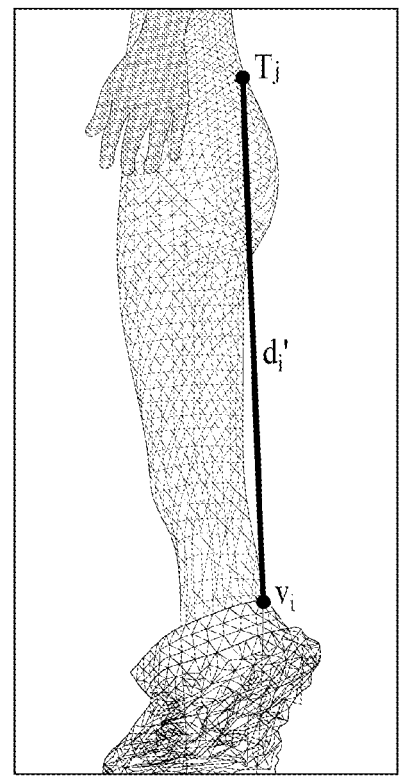
Figure 8:
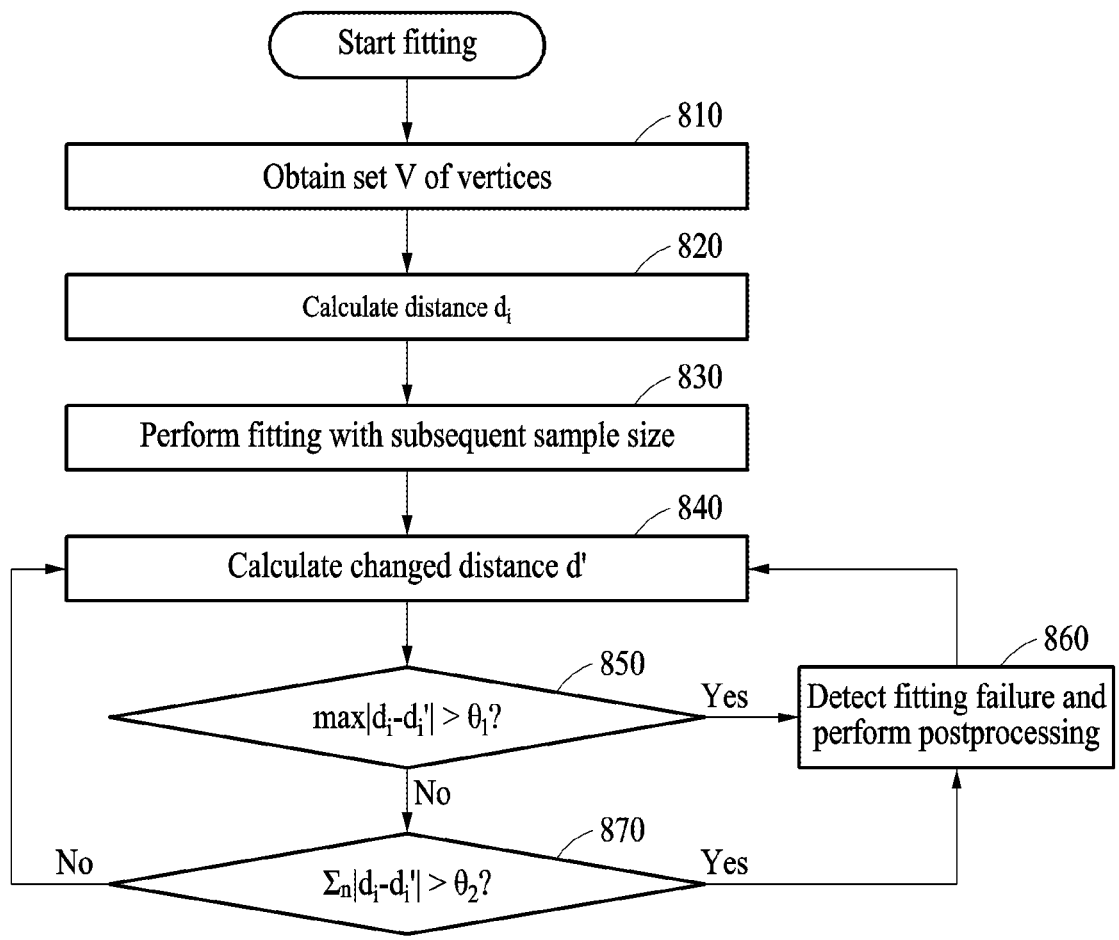
FIG. 8 is a flowchart illustrating an example of a method of detecting a fitting failure, according to an example embodiment.

FIGS. 7A through 7C illustrate an example of detecting a fitting failure, according to an example embodiment. FIG. 8 is a flowchart illustrating an example method of detecting a fitting failure, according to an example embodiment.

Referring to FIG. 7A, as the size of an avatar is changed (e.g., reduced) during fitting, and clothes that fit the original avatar may not fit the updated avatar with the changed size and may slide off the updated avatar. For example, when the size of the clothes is too large and does not fit the avatar as illustrated in FIG. 7A, the clothes does not fit an avatar shown on the right side (e.g., an avatar having the same height but lighter weight) of a smaller size than the avatar shown on the left side.

When the size of the clothes is smaller, may also be the same as the foregoing. A human body is actually a soft body. Thus, when clothes are smaller than a body size, the clothes may be tightly fit to the body. However, dissimilar to a real human body, an avatar that is a target for a simulation has a rigid body, as in a mannequin. Thus, when clothes are smaller than a body size, the clothes may be pushed toward a narrower side of the body, rather than the body is fit to the clothes. When the clothes are flexible or stretchy, the clothes may stretch to the body size. However, in a case of clothes made of a stiff material such as leather, the clothes may slip down by being pushed by the rigid body of the avatar. This is a phenomenon specific to a simulation of clothes based on an attribute (soft or rigid) of the avatar.

Thus, there is no need to attempt fitting with an avatar having a size where the fitting is predicted to be unsuccessful, and thus, an online fitting apparatus may obviate fitting with avatars with sizes that are unlikely to yield successful fitting. Accordingly, the efficiency of fitting can be increased by not performing fitting with avatar samples and reducing the number of avatar samples for performing the fitting.

A method of predicting unsuccessful fitting will be described in detail with reference FIGS. 7B, 7C and 8. The online fitting apparatus may calculate a distance between clothes 733 and an avatar 731 in a state (or an initial state) where the clothes 733 is well draped over or fitted to the avatar 731 as illustrated in FIG. 7B, and store the distance obtained through the calculating. The avatar 731 may be a reference avatar selected based on the body size of a user.

The distance between the clothes 733 and the avatar 731 may be calculated based on a distance between each vertex that forms the clothes 733 and a mesh of the avatar 731 that is nearest to such vertex. For example, in operation 810, the online fitting apparatus obtains a set V of vertices of the mesh of the clothes in contact with the avatar 731 in the initial state where the clothes 733 is well draped over or fitted to the avatar 731. The initial state may refer to a state in which clothes is well draped over or fitted to a reference avatar, and the online fitting apparatus may obtain a first set (e.g., the set V) including points of a second polygon in contact with a first mesh that forms the reference avatar among points of the second polygon of a second mesh that forms the clothes. Subsequently, the online fitting apparatus may calculate a distance between the set V of the vertices in contact with the mesh of the avatar 731.

In operation 820, the online fitting apparatus calculates a first distance $d_i$ between vertices $v_i$ ($v_i \in V$) included in the set V and a center point (that is, barycentric coordinates) of a j-th mesh $T_j$ that forms the avatar 731. For example, the online fitting apparatus may calculate, as $d_i$, a distance between barycentric coordinates of the first polygon of the first mesh that are nearest to points of the second polygon included in the first set and the points of the second polygon included in the first set.

The online fitting apparatus may store the distance between the clothes 733 and the avatar 731 in the initial state in which the clothes 733 is well draped or fitted as illustrated in FIG. 7B, and then perform a fitting process by varying a sample size of the avatar 731 with respect to the clothes 733.

In operation 830, the online fitting apparatus performs fitting with a subsequent sample size of the avatar 731. As a sample size of an avatar changes, the online fitting apparatus may calculate a distance between the changed sample size of the avatar and vertices of clothes.

In operation 840, the online fitting apparatus calculates a changed distance $d_i'$ between vertices $v_i'$ of the clothes and the j-th mesh of the avatar 731 as illustrated in the lower right portion 750 of FIG. 7. That is, the online fitting apparatus may calculate the distance $d_i'$ (e.g., a second distance) between the clothes and a target avatar in operation 840. For example, the online fitting apparatus may obtain a second set of points of the second polygon of the mesh of the clothes that is in contact with a target polygon of a third mesh that forms the target avatar, and then calculate, as the second distances, distances between barycentric coordinates of the target polygon of the third mesh that are nearest to the points of the second polygon included in the second set.

The online fitting apparatus may detect whether the clothes 733 fit the avatar unsuccessfully based on a difference ($|d_i-d_i'|$) between the first distance $d_i$ and the changed second distance $d_i'$. For example, when a deviation from the initial state in which the clothes 733 are well fitted as illustrated in the lower left portion 730 increases, a value of ($|d_i-d_i'|$) may increase.

In operation 850, the online fitting apparatus calculates a maximum value $$\left(\max_n |d_i - d_i'|\right)$$

of the differences between the distances $d_i$ and $d_i'$, and determines whether the maximum value is greater than a first threshold $\theta_1$.

In operation 860, when the maximum value of the differences between the distances $d_i$ and $d_i'$ is determined to be greater than the first threshold $\theta_1$ in operation 850, the online fitting apparatus determines the fitting as being unsuccessful and performs postprocessing after detecting a sample size of an avatar with which the fitting is unsuccessful. For example, in operation 860, the online fitting apparatus may return to operation 840, and newly calculate a changed distance between a new sample size of the avatar and vertices of the clothes.

However, in operation 870, when the maximum value of the difference between the distances $d_i$ and $d_i'$ is determined to be less than or equal to the first threshold $\theta_1$ in operation 850, the online fitting apparatus calculates an average value ($\Sigma_n |d_i-d_i'|$) of the difference between the distances $d_i$ and $d_i'$, and determines whether the average value is greater than a second threshold $\theta_2$.

For example, when the average value is determined to be greater than the second threshold in operation 870, the online fitting apparatus determines the fitting to be unsuccessful and performs operation 860. However, when the average value of the difference between the distances $d_i$ and $d_i'$ is determined to be less than or equal to the second threshold in operation 870, the online fitting apparatus performs operation 840.

The first threshold and the second threshold refer to reference values used for determining whether the fitting is unsuccessful and may be experimentally determined through experiments.

Figure 9:
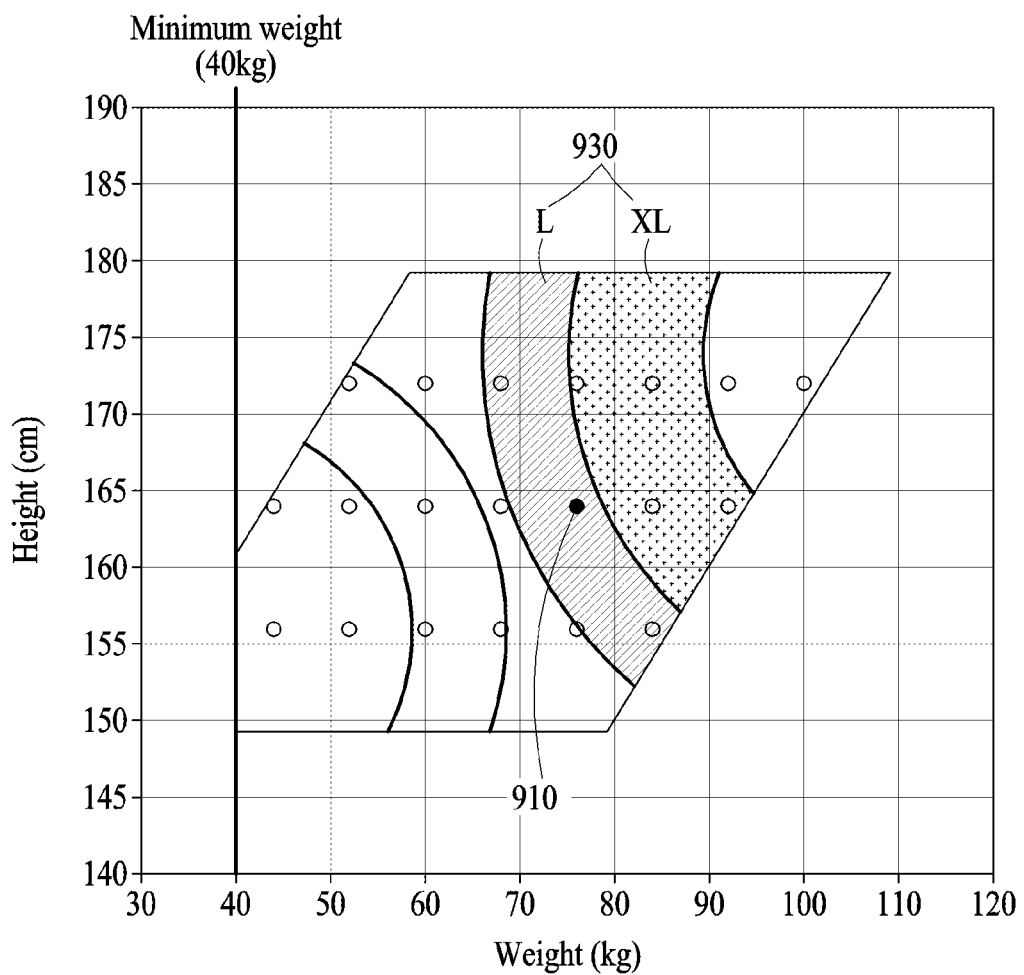
FIG. 9 is a diagram illustrating an example of visualizing and guiding a candidate size range by an online fitting apparatus, according to an example embodiment.

FIG. 9 is a diagram illustrating an example of visualizing and guiding a candidate size range by an online fitting apparatus according to an example embodiment. When fitting is unsuccessful, an online fitting apparatus may visualize a candidate size range corresponding to clothes based on a body size 910 input from a user, and provide the visualized candidate size range.

For example, when a user contemplating purchasing of clothes has the body size 910 with a height of 164.8 cm and a weight of 76 kg, the online fitting apparatus may visualize a size (or a size range) with which fitting of the clothes to an avatar having the same or similar body size does not fail as a result of a pre-simulation, and guide the user with the visualized size range.

In another example, the online fitting apparatus may visualize a body size range of a user corresponding to each size of the clothes T, for example, an S size, an M size, an L size, and an extra-large (XL) size, and the like, and provide the visualized body size range.

Figure 10:
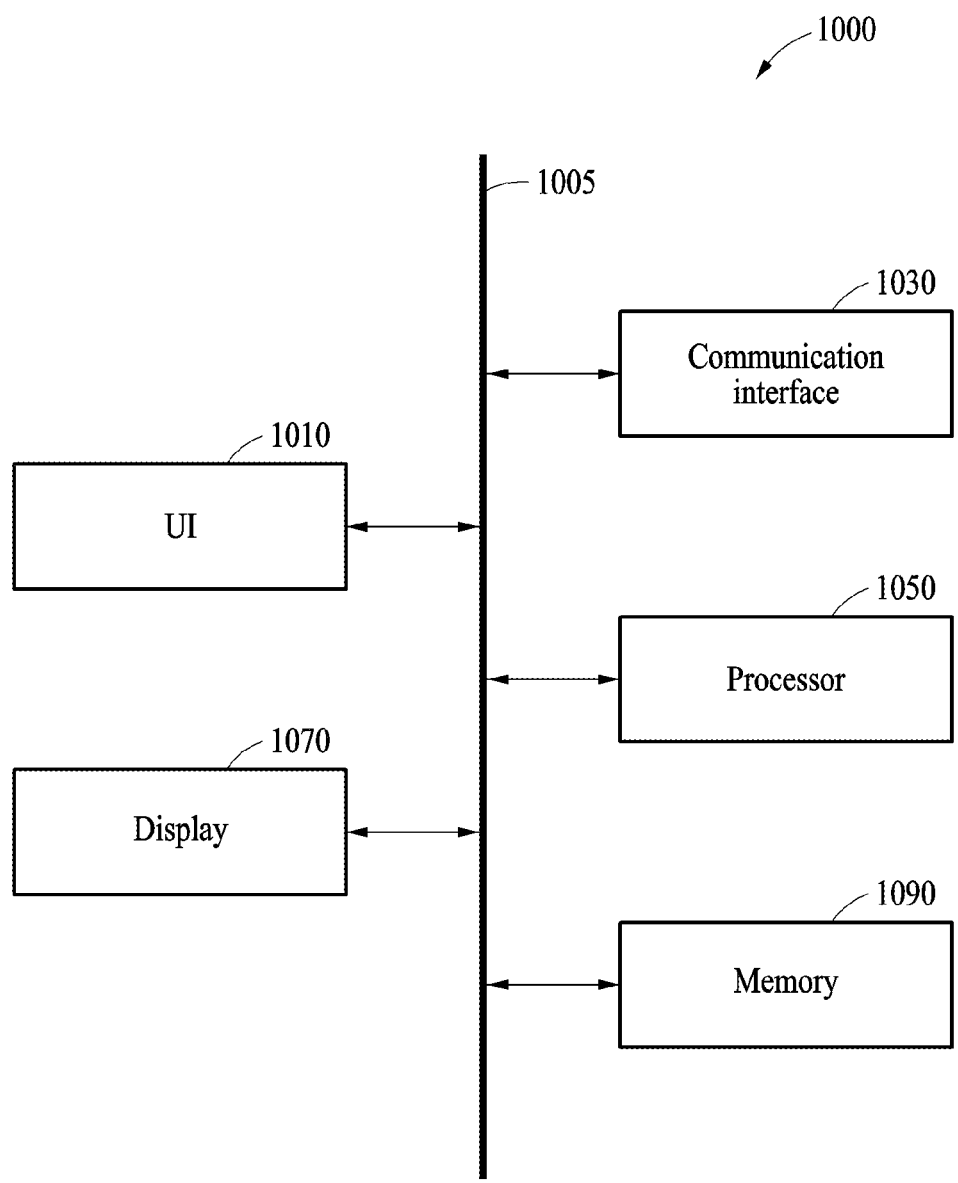
FIG. 10 is a diagram illustrating an example of an online fitting apparatus, according to an example embodiment.

FIG. 10 is a diagram illustrating an example of an online fitting apparatus according to an example embodiment. Referring to FIG. 10, an online fitting apparatus 1000 includes a user interface (UI) 1010, a communication interface 1030, a processor 1050, a display 1070, and a memory 1090. The UI 1010, the communication interface 1030, the processor 1050, the display 1070, and the memory 1090 may communicate with one another through a communication bus 1005.

The UI 1010 may receive, from a user, a body size of the user and a target size of clothes the user desires to drape. The UI 101 may include, for example, hardware devices such as keyboard, mouse or touchscreen.

The communication interface 1030 may obtain barycentric coordinate information corresponding to a result of fitting the clothes of the target size to a reference avatar selected based on the body size of the user. The barycentric coordinate information may include at least one of parameters representing a 3D position transformation relationship between a first polygon of a first mesh forming the reference avatar and a point of a second polygon of a second mesh forming the clothes draped over the reference avatar, or an index of the second polygon. The parameters may include at least one of coefficients for calculating the barycentric coordinate information, or an offset between the first polygon and the point of the second polygon.

The processor 1050 may execute instructions stored in memory 1090 to perform aforementioned functions. For example, the processor 1050 may generate a target avatar having the same mesh topology as the reference avatar and corresponding to the body size of the user. The processor 1050 may fit the clothes to the target avatar by applying the barycentric coordinate information to the target avatar.

For example, the processor 1050 may extract, from the barycentric coordinate information, an index of the first polygon included in the first mesh forming the reference avatar, and a plurality of parameters representing a 3D position of a point of the clothes matched to the first polygon based on the first polygon. The processor 1050 may identify a target polygon corresponding to the first polygon from a third mesh forming the target avatar based on the mesh topology and the index of the first polygon. The processor 1050 may determine the 3D position of the point of the clothes by applying the parameters to the target polygon. The 3D position of the point of the clothes determined by the processor 1050 may correspond to a result of fitting the clothes to the target avatar.

For example, the processor 1050 may identify the target polygon to be mapped to the first polygon based on a corresponding relationship between the index of the first polygon of the first mesh forming the reference avatar and an index of the target polygon of the third mesh forming the target avatar. The processor 1050 may fit the clothes to the target avatar by applying the barycentric coordinate information to each point of the target polygon to be mapped to the first polygon.

When the clothes include a supplemental material, such as, for example, a button, an ornament, a graphics, and a logo, the processor 1050 may obtain second barycentric coordinate information corresponding to a result of attaching the supplemental material to the clothes. The processor 1050 may apply the second barycentric coordinate information to the clothes fitted to the target avatar.

The display 1070 may display the result of fitting the clothes to the target avatar by the processor 1050.

The memory 1090 may store therein the body size of the user and the target size of the clothes desired by the user to drape which are input through the UI 1010. The memory 1090 may store therein the barycentric coordinate information obtained through the communication interface 1030.

The memory 1090 may also store information associated with the target avatar generated by the processor 1050 and/or the result of fitting the clothes to the target avatar.

In addition to the foregoing, the memory 1090 may store various sets of information generated in a processing process performed by the processor 1050. Also, the memory 1090 may store various sets of data and a program. The memory 1090 may include a volatile or nonvolatile memory. The memory 1090 may include a massive storage medium such as a hard disk to store various sets of data.

In addition, the processor 1050 may perform one or more, or all, of the operations or methods described above with reference to FIGS. 1 through 9, or an algorithm corresponding the one or more, or all, of the operations or methods. The processor 1050 may be a hardware-implemented data processing device having a physically structured circuit to perform desired operations. The desired operations may include, for example, a code or instructions included in a program. The processor 1050 may be embodied as a central processing unit (CPU), a graphics processing unit (GPU), or a neural processing unit (NPU), for example. The online fitting apparatus 1000 implemented by hardware may include, for example, a microprocessor, a CPU, a processor core, a multi-core processor, a multiprocessor, an application-specific integrated circuit (ASIC), and a field-programmable gate array (FPGA).

The processor 1050 may execute the program and control the online fitting apparatus 1000. A code of the program to be executed by the processor 1050 may be stored in the memory 1090.

Embodiments enable obtaining more rapid results of draping clothes of various sizes by retrieving prestored barycentric coordinate information calculated based on results of draping in advance clothes of different sizes over 3D reference avatars having different body sizes for each body part. The amount of operations to generate a target avatar having a similar body size to body sizes of reference avatars sampled at a unit interval for each clothing size is also reduced.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

What is claimed is:

1. A computer-implemented online fitting method, comprising:

receiving a size of a user's body and a target size of clothes for fitting to the user's body;

obtaining barycentric coordinate information corresponding to a result of fitting the clothes of the target size to a reference avatar;

generating a target avatar having a mesh with a topology that is identical to a topology of a mesh of the reference avatar, the target avatar corresponding to the size of the user's body; and draping the clothes of the target size to the target avatar by at least applying the barycentric coordinate information to the target avatar, wherein the obtaining of the barycentric coordinate information comprises:

selecting a first body size corresponding to the size of the user's body from a plurality of predetermined body sizes, and retrieving, from a database storing in advance pieces of barycentric coordinate information as results of draping the clothes of the target size on a plurality of reference avatars having the plurality of predetermined body sizes, the barycentric coordinate information corresponding to the result of fitting the clothes of the target size to the reference avatar selected from the stored pieces of barycentric coordinate information based on the first body size, the pieces of barycentric coordinate information generated by performing simulation of draping the clothes of the target size on the plurality of predetermined body sizes.

2. The online fitting method of claim 1, wherein the barycentric coordinate information includes at least one of (i) indices of a first polygon in the mesh of the reference avatar or (ii) parameters representing a three-dimensional (3D) transformation relationship between the first polygon and a second polygon in a mesh of the clothes that fit the reference avatar.

3. The online fitting method of claim 2, wherein the parameters include at least one of (i) coefficients for calculating the barycentric coordinate information, (ii) an offset between the first polygon and the second polygon, or (iii) identification information of the mesh of the reference avatar corresponding to the barycentric coordinate information.

4. The online fitting method of claim 1, wherein the clothes is fitted to the target avatar by:

extracting, from the barycentric coordinate information, an index of a first polygon in the mesh of the reference avatar and a plurality of parameters representing a point of the clothes matching the first polygon, identifying a target polygon corresponding to the first polygon from the mesh of the target avatar based on the topology of the mesh of the target avatar and the index of the first polygon, and determining the point of the clothes by applying the parameters to the target polygon, wherein the determined point of the clothes corresponds to the result of fitting the clothes to the target avatar.

5. The online fitting method of claim 1, wherein the clothes is fitted to the target avatar by:

identifying a target polygon in the mesh of the target avatar for mapping to a first polygon in the mesh of the reference avatar using correspondence between an index of the first polygon and an index of the target polygon; and fitting the clothes to the target avatar by applying the barycentric coordinate information to each point of the target polygon mapped to the first polygon.

6. The online fitting method of claim 1, wherein, when the clothes includes a supplemental material, and the clothes is fitted to the target avatar by:

obtaining supplemental barycentric coordinate information corresponding to a result of attaching the supplemental material to the clothes; and applying the supplemental barycentric coordinate information to the clothes fitted to the target avatar.

7. The online fitting method of claim 6, wherein, when the supplemental material is a rigid body, applying the supplemental barycentric coordinate information to the clothes comprises:

applying the supplemental barycentric coordinate information to the clothes fitted to the target avatar by applying the supplemental barycentric coordinate information and a 3D orientation of the supplemental material to a point of a mesh of the supplemental material.

8. The online fitting method of claim 1, wherein obtaining the barycentric coordinate information comprises receiving the barycentric coordinate information from a server or a database.

9. The online fitting method of claim 1, further comprising:

storing results of fitting clothes of different sizes to reference avatars of different body sizes as prestored barycentric coordinate information, the barycentric coordinate information corresponding to the result of fitting the clothes of the target size to the reference avatar obtained from the prestored barycentric coordinate information.

10. The online fitting method of claim 9, wherein the different body sizes are sampled at a unit interval for each size of the clothes.

11. The online fitting method of claim 1, further comprising:

determining whether the clothes of the target size successfully fit the target avatar by at least applying the barycentric coordinate information to the target avatar, and in response to determining that the clothes of the target size is not successfully fitted to the target avatar, displaying a message notifying that the fitting is unsuccessful.

12. The online fitting method of claim 1, further comprising:
    determining presence of an intersection between a target polygon in the mesh of the target avatar and a polygon in a mesh of the clothes fitted to the reference avatar; and
    in response to the presence of the intersection, determining that the clothes of the target size is successfully fitted.

13. The online fitting method of claim 1, further comprising:
    determining first distances between points on a mesh of the clothes and the mesh of the reference avatar with the clothes fitted to the reference avatar;
    determining second distances between points on the mesh of the clothes and the mesh of the target avatar; and
    determining whether the fitting is successful based on differences between the first distances and corresponding ones of the second distances.

14. The online fitting method of claim 13, wherein determining the first distances comprises:
    obtaining points of polygons in the mesh of the clothes as the points on the mesh of the clothes, the polygons in contact with the mesh of the reference avatar; and
    determining, as the first distances, distances between barycentric coordinates of polygons in the mesh of the reference avatar that are nearest to the obtained points of the polygons in the mesh of the clothes.

15. The online fitting method of claim 13, wherein determining the second distances comprises:
    obtaining points of a polygon in a mesh of the clothes as the points on the mesh of the clothes, the polygon in contact with a target polygon in the mesh of the target avatar; and
    determining, as the second distances, distances between barycentric coordinates of polygons in the target avatar that are nearest to the obtained points.

16. The online fitting method of claim 13, determining whether the fitting is successful based on the differences between the first distances and the second distances comprises:
    determining a maximum value of the differences between the first distances and the corresponding second differences; and
    determining whether the fitting is successful based on whether the maximum value is greater than a threshold value.

17. The online fitting method of claim 13, wherein determining whether the fitting is successful based on the differences between the first distances and the second distances comprises:
    determining an average value of the differences between the first distances and the corresponding second distances; and
    determining whether the fitting is successful based on whether the average value is greater than a second threshold value.

18. The online fitting method of claim 1, further comprising:
    providing guidance on a candidate size corresponding to the clothes based on the size of the user's body through visualization.

19. A non-transitory computer-readable storage medium storing instructions that, when executed by a processor, cause the processor to:
    receive a size of a user's body and a target size of clothes for fitting to the user's body;
    obtain barycentric coordinate information corresponding to a result of fitting the clothes of the target size to a reference avatar;
    generate a target avatar having a mesh with a topology that is identical to a topology of a mesh of the reference avatar, the target avatar corresponding to the size of the user's body; and
    drape the clothes of the target size to the target avatar by at least applying the barycentric coordinate information to the target avatar,
    wherein the instructions that cause the processor to obtain the barycentric coordinate information comprises instructions to:
        select a first body size corresponding to the size of the user's body from a plurality of predetermined body sizes, and
        retrieve, from a database storing in advance pieces of barycentric coordinate information as results of draping the clothes of the target size on a plurality of reference avatars having the plurality of predetermined body sizes, the barycentric coordinate information corresponding to the result of fitting the clothes of the target size to the reference avatar selected from the stored pieces of barycentric coordinate information based on the first body size, the pieces of barycentric coordinate information generated by performing simulation of draping the clothes of the target size on the plurality of predetermined body sizes.

20. An online fitting apparatus, comprising:
    a user interface (UI) device configured to receive a size of a user's body and a target size of clothes for fitting;
    a communication interface configured to obtain barycentric coordinate information corresponding to a result of fitting the clothes of the target size to a reference avatar; and
    a processor configured to:
        generate a target avatar having a mesh with a topology that is identical to a topology of a mesh of the reference avatar, the target avatar corresponding to the size of the user's body,
        drape the clothes of the target size to the target avatar by at least applying the barycentric coordinate information to the target avatar,
        select a first body size corresponding to the size of the user's body from a plurality of predetermined body sizes, and
        retrieve, from a database storing in advance pieces of barycentric coordinate information as results of draping the clothes of the target size on a plurality of reference avatars having the plurality of predetermined body sizes, the barycentric coordinate information corresponding to the result of fitting the clothes of the target size to the reference avatar selected from the stored pieces of barycentric coordinate information based on the first body size, the pieces of barycentric coordinate information generated by performing simulation of draping the clothes of the target size on the plurality of predetermined body sizes.

* * * * *